United States Patent

Okada

[15] 3,649,747

[45] Mar. 14, 1972

[54] SEQUENTIAL COLOR SIGNAL CONTROL CIRCUIT

[72] Inventor: Takashi Okada, Tokyo, Japan

[73] Assignee: Sony Corporation, Tokyo, Japan

[22] Filed: Apr. 22, 1970

[21] Appl. No.: 30,787

[30] Foreign Application Priority Data

Apr. 24, 1969 Japan....................................44/31673

[52] U.S. Cl. ..........................................................178/5.4 R

[51] Int. Cl. ..........................................................H04n 9/04

[58] Field of Search ..............178/5.4 R, 5.4 S, 5.4 CF, 5.2 R; 328/208; 330/144, 176

[56] References Cited

UNITED STATES PATENTS

| | | | |
|---|---|---|---|
| 3,315,029 | 4/1967 | Suhrmann | 178/5.4 R |
| 3,013,116 | 12/1961 | Sziklai et al. | 178/7.5 DC |
| 3,461,224 | 8/1969 | McMann, Jr. | 178/5.4 R |
| 3,200,193 | 8/1965 | Briggs et al. | 178/5.4 R |
| 3,524,013 | 8/1970 | Hillman | 178/5.4 R |
| 2,406,760 | 9/1946 | Goldmark | 178/5.2 R |
| 2,646,463 | 7/1953 | Schroeder | 178/5.4 R |
| 2,710,308 | 6/1955 | Schade | 178/5.4 R |

*Primary Examiner*—Robert L. Richardson
*Assistant Examiner*—George G. Stellar
*Attorney*—Lewis H. Eslinger, Alvin Sinderbrand and Curtis, Morris and Safford

[57] ABSTRACT

In a control circuit which maintains a desired ratio of sequential color video signals for color television transmission, the color video signals are sequentially supplied to respective impedance bridges which are constituted by four impedance elements at least one of which is variable for control of the DC signal level. The output color video signal is taken from a connection point in a series arrangement of a plurality of impedance elements connected across each bridge, with at least one element in the series arrangement being variable for control of the AC signal level.

5 Claims, 2 Drawing Figures

INVENTOR.
TAKASHI OKADA

INVENTOR.
TAKASHI OKADA

SEQUENTIAL COLOR SIGNAL CONTROL CIRCUIT

BACKGROUND OF THE INVENTION

1. Field of the Invention

This invention relates generally to a signal control circuit and has more particular reference to a circuit which is suitable for use in controlling the voltage level of a sequential color video signal so as to establish desired changes in the voltage level.

2. Description of the Prior Art

Color television transmission methods have been proposed which employ a sequential color television signal consisting of a plurality of different color signals sequentially arranged in time. One such method uses a line sequential system in which color signals are sequentially arranged every horizontal scanning period. Another method utilizes a field sequential system in which the color signals are sequentially arranged every vertical scanning period.

In order to produce such sequential color television signals, as for example, the field sequential color television signals, a method has been proposed in which a rotary color filter made up of a plurality of different color filter elements, such as, red, green and blue color filter elements sequentially arranged, is disposed between a conventional image pickup tube and an object to be televised. Light from the image of the object passes through the color filter to the pickup tube where red, green and blue signals are produced. The system utilizing this method is generally known as the CBS system.

However, the signal levels of the red, green and blue color signals of the field sequential color video signal thus obtained cannot be held at a predetermined ratio because of either dispersion in the amount of light passing through each color filter element of the rotary color filter or dispersion in the spectral sensitivity characteristics of the image pickup tube both of which disturb the white balance.

SUMMARY OF THE INVENTION

Accordingly, one object of this invention is to provide a video signal level control circuit which ensures the maintenance of sequential color television signal levels at a predetermined ratio.

Another object of this invention is to provide a video signal level control circuit which ensures a sequential color television signal providing for stabilized white balance.

Still another object of this invention is to provide a video signal level control circuit which is simply constructed and inexpensive.

Other objects, features and advantages of this invention will become apparent from the following description taken in conjunction with the accompanying drawings.

DESCRIPTION OF THE PREFERRED EMBODIMENTS

Figure 1:
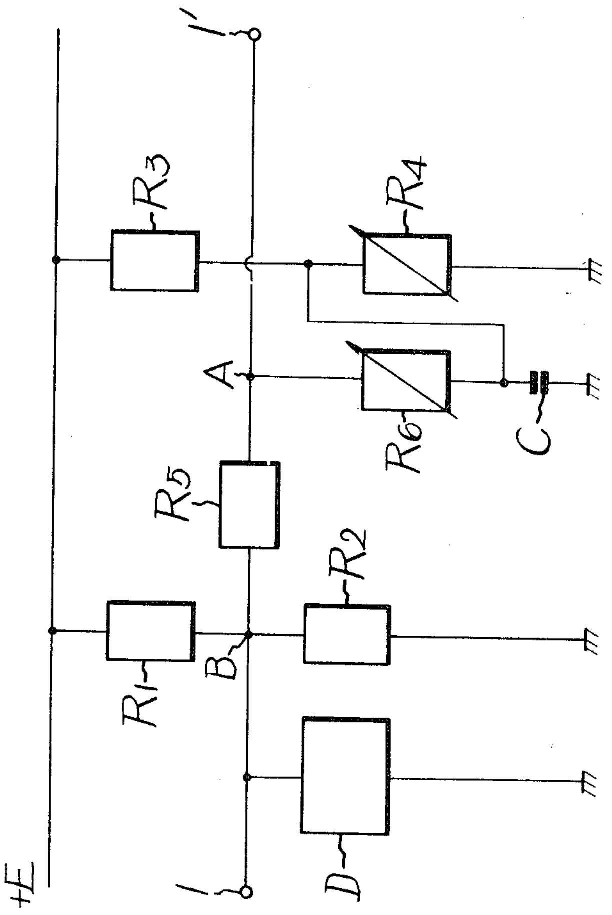
FIG. 1 is a block diagram for explaining the fundamental operation of a video signal level control circuit of this invention.

Referring first to FIG. 1, a description will be given of the fundamental operation of this invention.

In accordance with the present invention, a bridge circuit is formed with first to fourth impedance elements $R_1$, $R_2$, $R_3$ and $R_4$. A DC power source E is connected between the connection point of the first and third impedance elements $R_1$ and $R_3$ and the connection point of the second and fourth impedance elements $R_2$ and $R_4$. The connection point B of the first and second impedance elements $R_1$ and $R_2$ and the connection point of the third and fourth impedance elements $R_3$ and $R_4$ are interconnected through a series circuit of fifth and sixth impedance elements $R_5$ and $R_6$. An input terminal 1 is connected to the connection point B of the first and second impedance elements $R_1$ and $R_2$ and an output terminal 1′ is connected to the connection point A of the fifth and sixth impedance elements $R_5$ and $R_6$. The DC level of an output signal derived at the output terminal 1′ is controlled by the adjustment of the impedance value of at least one of the first to fourth impedance elements $R_1$ to $R_4$, for example, $R_4$. The AC level of the output signal is controlled by the adjustment of the impedance value of at least one of the fifth and sixth impedance elements $R_5$ and $R_6$, for example, $R_6$. Reference character D indicates a clamping circuit connected between point B and ground. A capacitor C is connected between the $R_3$–$R_4$ connection and ground. An AC signal fed to the input terminal 1, which is clamped by the clamping circuit D to a predetermined level and is supplied to the connection point B of the impedance elements $R_1$ and $R_2$ where it is superimposed on the DC level $E\times(R_2/R_1+R_2)$ determined by the impedance elements $R_1$ and $R_2$. If $R_1{:}R_2=R_3{:}R_4$, the DC level at the connection point A of the impedance elements $R_5$ and $R_6$ is $E\times(R_2/R_1+R_2)$. However a change in the impedance value of $R_4$ causes a change in the ratio $R_3{:}R_4$, so that the DC level naturally varies from $E\times(R_2/R_1+R_2$. An AC signal voltage divided by the impedance elements $R_5$ and $R_6$, is present at the connection point A where it is superimposed on the DC level of the point A. A change in the impedance value of the impedance element $R_6$ leads to a variation in the voltage dividing ratio of the AC voltage thus causing a change in the amplitude of the AC signal voltage. Therefore, the output signal at terminal 1′ consists of an AC component determined by the impedance setting on $R_6$, superimposed on a DC component, determined by the impedance setting on $R_4$.

The signal control circuit of this invention effectively utilizes the fundamental operation just described to attain the objects of the invention previously set forth. Such use will be discussed in greater detail as follows.

Figure 2:
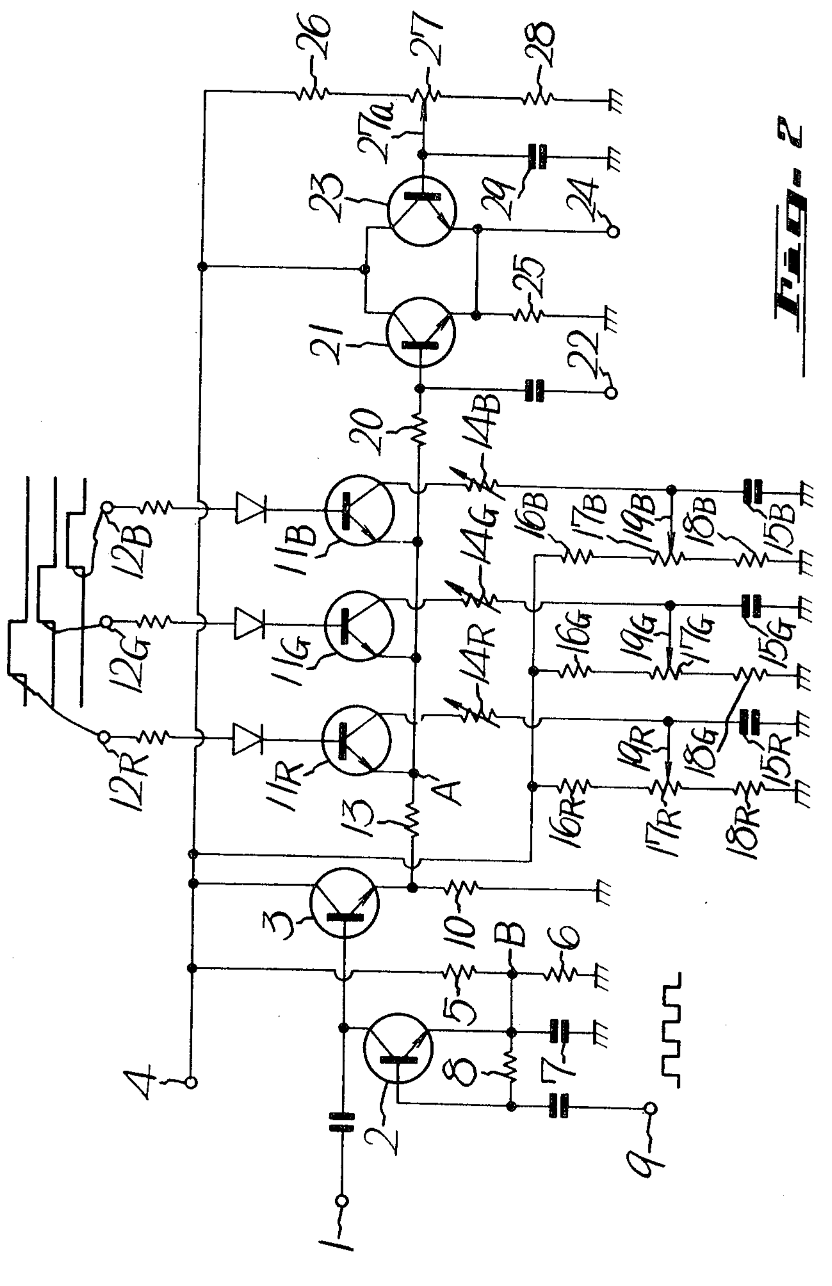
FIG. 2 is a schematic connection diagram showing one embodiment of this invention.

Referring now to FIG. 2, the signal control circuit of this invention will hereinafter be described where the levels of the red, green and blue color components of the color video signal, derived from a field sequential color image pickup tube are held at a predetermined ratio.

In the figure, reference numeral 1 indicates an input terminal for a color video signal from a field sequential color image pickup tube. This input terminal 1 is connected through a capacitor to the collector of an NPN-type transistor 2 which is used for pedestal clamping. The collector of the transistor 2 is connected to the base of a second NPN-type transistor 3 which forms a high impedance, emitter-follower amplifier. Reference numeral 4 designates a positive DC power source terminal, which is grounded through a series circuit of resistors 5 and 6 corresponding to the impedance elements $R_1$ and $R_2$ shown in FIG. 1. The emitter of the transistor 2 is grounded through a capacitor 7 and is connected to the connection point of the resistors 5 and 6. The clamping level of the clamping circuit is determined by the resistors 5 and 6. The emitter and base transistor 2 are connected through each other through a resistor 8. The base of the transistor 2 is also connected through a capacitor to an input terminal 9 where a horizontal period pulse having a period corresponding to that of the horizontal synchronizing signal is applied. Accordingly, the pedestal of the field sequential color video signal is clamped whenever a pulse is supplied to the input terminal 9. The collector of transistor 3 is connected to the power source terminal 4 and the emitter of this transistor is grounded through resistor 10. Reference numerals 11R, 11G and 11B respectively designate NPN-type switching transistors which are repeatedly turned on sequentially during the vertical scanning period by gate signals which are synchronized with the vertical scanning period and are repeatedly supplied sequentially to gate signal input terminals 12R, 12G and 12B which are respectively connected to the bases of the transistors 11R, 11G and 11B through resistors and diodes. The emitters of transistors 11R, 11G and 11B are connected to the emitter of the transistor 3 through a resistor 13 which corresponds to the impedance element $R_5$ of FIG. 1. The collectors of the transistors 11R, 11G and 11B are grounded respectively through series circuits consisting of variable resistors 14R, 14G and 14B, each corresponding to the impedance element $R_6$ of FIG. 1, and capacitors 15R, 15G and 15B, each corresponding to the capacitor C of FIG. 1. Consequently, adjustment of the variable resistors 14R, 14G and 14B enables adjustment of the AC level of the signal at the connection point A of the emitters of the transistors 11R, 11G and 11B when these transistors are respectively conducting the power source terminal 4 is grounded through parallel circuits respectively consisting of resistors 16R, 16G and 16B, each corresponding to the impedance elements $R_3$ of FIG. 1, variable resistors 17R, 17G and 17B, each corresponding to the impedance element $R_4$ of FIG. 1, and resistors 18R, 18G and 18B. Sliders 19R, 19G and 19B of the variable resistors 17R, 17G and 17B are respectively connected to connection points of the variable resistors 14R, 14G and 14B with the capacitors 15R, 15G and 15B. Accordingly, adjustment of the sliders 19R, 19G and 19B of the variable resistors 17R, 17G and 17B enables adjustment of the DC levels of the signals at the point A when the transistors 11R, 11G and 11B are respectively conducting. In this case, the transistors 2, 3 and 11R (11G and 11B) are interposed between middle points of a bridge circuit formed by the resistors 5, 6, 16R (16G and 16B), 17R (17G and 17B) and 18R (18G and 18B). The operation of this circuit is the same as that of FIG. 1.

In the illustrated example, the connection point A of the emitters of the transistors 11R, 11G and 11B with the resistor 13, corresponding to the impedance element $R_4$ of FIG. 1, is connected to the base of an NPN-type transistor 21 through a resistor 20. A blanking signal input terminal 22, which is supplied with a video blanking signal, is connected to the connection point of resistor 20 with the base of the transistor 21. The collector of transistor 21 is connected to the collector of a transistor 23 and to the power source terminal 4. The emitters of transistors 21 and 23 are interconnected, attached to a video signal output terminal 24, and grounded through a resistor 25. The base of the transistor 23 is connected to the slider 27*a* of a variable resistor 27 in a series circuit consisting of a resistor 26, the variable resistor 27 and a resistor 28. This circuit is connected between the power source terminal 4 and ground. The setup level of the video signal is defined by the adjustment on slider 27*a* of the variable resistor 27. The connection point of the slider 27*a* with the base of the transistor 23 is also grounded through a capacitor 29.

With such an arrangement, when a red color signal of a field sequential color video signal is supplied to the input terminal, a signal is applied to the gate signal input terminal 12R to switch on the switching transistor 11R. Meanwhile the other switching transistors 11G and 11B are in the off state and accordingly exhibit high impedance. Consequently, the DC level of the red color component of the field sequential color video signal is dependent upon the resistance values of the resistors 5, 6, 16R, 17R, and 18R. The red color signal can be adjusted to a predetermined level by the adjustment of the slider 19R of variable resistor 17R. Further, the AC level of the red color signal, that is, the amplitude of the red color signal, is determined by the resistor 13 and the variable resistor 14R. Accordingly, the red color signal can be adjusted to a predetermined AC level by adjustment of the resistance value of variable resistor 14R. In a similar manner the DC and AC levels of the green and blue color signals supplied to the input terminal 1 can be respectively adjusted to predetermined values by adjustment of the sliders 19G and 19B of variable resistors 17G and 17B, and by setting variable resistors 14G and 14B. Accordingly, this invention ensures that the DC and AC levels of the red, green and blue color signals of the field sequential color video signal derived from the field sequential color image pickup device are maintained at a predetermined ratio. Hence, this invention permits production of color video signals with excellent white balance.

Of course, resistors 5, 6, 13, 16R, 18R, 16G, 18G, 16B and 18B and variable resistors 14R, 14G, 14B, 17R, 17G and 17B, used in the foregoing example, may be replaced with other impedance elements without departing from the scope of this invention.

Although the present invention has been described as applied to the case where the levels of the red, green and blue color signals of a field sequential color video signal are held at a predetermined ratio, it will be seen that the invention is similarly applicable to the case where it is desired to maintain the levels of red, green and blue color signals of a line sequential color video signal at a predetermined ratio.

It will be apparent that many modifications and variations may be effected without departing from the scope of the novel concepts of this invention.

I claim as my invention:

1. A control circuit for maintaining a desired ratio of sequential color video signals for color television transmission, comprising three parallel bridge circuits respectively associated with the sequential color video signals of the color television signal to be transmitted, said bridge circuits having two impedance elements in common and each having at least two additional impedance elements individual to the respective bridge circuit, said impedance elements of the bridge circuits being connected to provide a first pair of opposed connection points in common and, for each of said bridge circuits, a second pair of opposed connection points with one of said second pair of connection points being common to all of said bridge circuits, a DC voltage source connected across said first pair of connection points, series arrangements of impedance elements connected between said second pair of connection points of said bridge circuits, said series arrangements having at least one of said impedance elements thereof in common, input means for applying sequential color video signals to said one of said second pair of connection points, output means connected to each of said series arrangements intermediate the impedance elements thereof, switching means in each of said series arrangements operated in synchronism with the sequential color video signals applied to said input means so that each of said bridge circuits is rendered operative in concurrence with the respective color video signal, at least one of said additional impedance elements of each of said bridge circuits being variable for adjusting the DC level of the respective color video signal derived at said output means, and at least one of said impedance elements of each of said series arrangements being variable for adjusting the AC level of the respective color video signal derived at said output means.

2. A control circuit according to claim 1, in which each of said impedance elements is a resistor.

3. A control circuit according to claim 1, in which the other of said second pair of connection points of each of said bridge circuits is connected to ground through a respective capacitor.

4. A control circuit according to claim 1, wherein said input means includes a clamping circuit which clamps the input signal at a level determined by the voltage drop across at least one of said two impedance elements common to the three bridge circuits.

5. A control circuit according to claim 4, in which high impedance amplifier means is connected between said clamping circuit and each of said series arrangements.

* * * * *